(No Model.)

D. F. PARKER.
COUPON ACCOUNT BOOK.

No. 443,973. Patented Dec. 30, 1890.

WITNESSES:

INVENTOR:
D. F. Parker
BY Munn &
ATTORNEYS

UNITED STATES PATENT OFFICE.

DAVID FRANK PARKER, OF RED CLOUD, NEBRASKA.

COUPON ACCOUNT-BOOK.

SPECIFICATION forming part of Letters Patent No. 443,973, dated December 30, 1890.

Application filed March 28, 1890. Serial No. 345,708. (No model.)

*To all whom it may concern:*

Be it known that I, DAVID FRANK PARKER, of Red Cloud, in the county of Webster and State of Nebraska, have invented a new and useful Improvement in Coupon Account-Books, of which the following is a full, clear, and exact description.

My invention is an improvement in coupon account-books adapted to serve as substitutes for the ordinary pass-books used by purchasers of goods at retail.

Reference is to be made to the accompanying drawings, forming a part of this specification, in which similar figures and letters of reference indicate corresponding parts in all the views.

Figure 1:
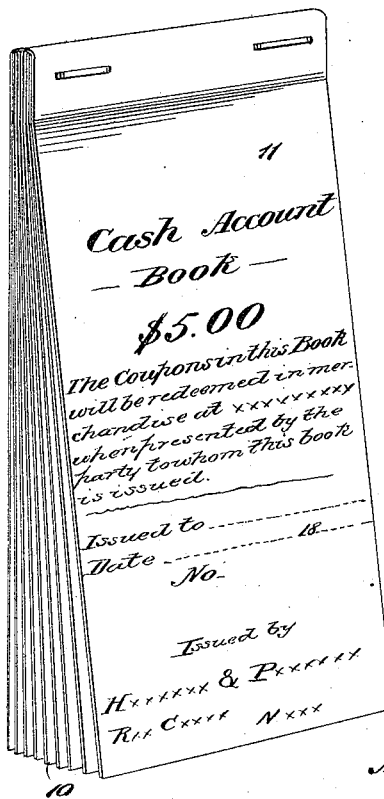
Figure 2:
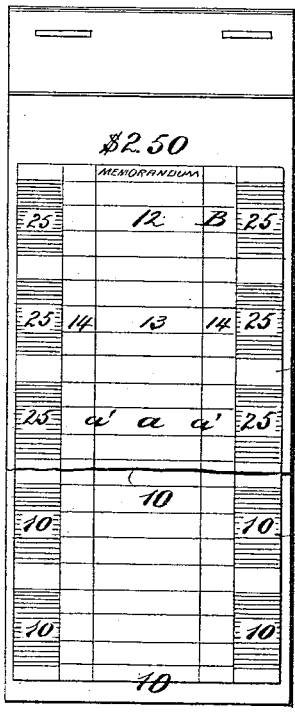
Figure 3:
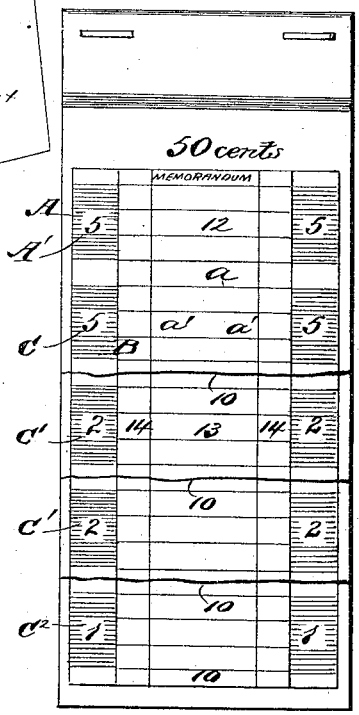

Figure 1 is a perspective view of a book made in accordance with my invention. Fig. 2 is a partial face view of one leaf, the said leaf being broken away to disclose one immediately beneath it; and Fig. 3 is a partial face view of a series of leaves, each of said leaves having produced thereon a different fractional portion of a dollar.

The book is made up of a series of leaves 10, which leaves are provided with a suitable backing 11, upon which backing the amount of the coupons contained in the book is printed and likewise the directions for the use of the book. Each of the leaves is provided with a central memorandum-space 12, which is ordinarily ruled transversely, as shown at $a$, and longitudinally, as illustrated at $a'$, forming large spaces 13 and smaller side spaces 14, and at one or both edges of each page, preferably at both edges, a coupon A is formed, which coupon consists ordinarily of a figure A', representing dollars or fractional portions thereof, surrounded by scroll-work or ornamentation of any description; but I desire it to be distinctly understood that the scroll-work or ornamentation may be dispensed with, if found desirable.

If the book contains five dollars' worth of coupons, for instance, the first page thereof would be marked at its head or top "$2.50," as illustrated in Fig. 2, and would contain coupons each bearing the number "25," representing cents, and of a number sufficient to collectively indicate the amount at the head of the page. The amount of coupons upon the next page may be indicated as "$1.00," for instance, and each coupon, which would then be ten in number, would have the number "10" produced thereon, indicating ten cents, as shown at B in the said Fig. 2. Thus each page may, if desired, contain coupons of different denominations—as, for instance "5," as illustrated at C in Fig. 3, representing cents; "2," as shown at C', and "1," as shown at $C^2$ in Fig. 3.

When the figure "5" is employed in connection with the coupon, ".50" is usually printed at the head or top of the page, indicating the amount of the coupons upon that page, ten coupons being found a desirable number, as the leaves when bound form a book of very convenient size.

I desire it to be distinctly understood that I do not confine myself to the production at the head of the page of the amount of the coupons contained upon the page or to the denominations indicated by the figures in the drawings, and that the book may be issued to represent a less or a greater amount than five dollars; and, further, that the leaves of the book are preferably variously colored, one color being appropriated to coupons of the same denomination. This arrangement is made to enable the salesman to readily turn to the page bearing coupons of a certain denomination to facilitate the work of cancellation.

In using the book it is intended that the book of credit, representing, for instance, five dollars, can be given to a customer as a substiute for a pass-book, this amount being charged against the account of the customer. Whenever a purchase is to be made, the book is brought to the store and the salesman makes an entry in the memorandum-space of the article or articles purchased and the date when bought and the price of each article, if so desired, while the aggregate amount of the purchase is indicated by canceling one or more coupons of a denomination equal to the aggregate purchase amount. The cancellation is usually effected by punching out the figures upon the coupons. Thus if a purchase is made the aggregate of which is thirty-seven cents one coupon of the twenty-five-cents denomination would be cancelled, another of ten, and another of two.

Having thus described my invention, I claim as new, and desire to secure by Letters Patent—

A coupon account-book redeemable in merchandise to a certain cash value, each leaf having a space for an itemized account, and cash-value marks, the total of which marks is the value for which the book was issued, the coupons on each leaf having the same cash value and aggregating the amount of the said cash-value mark thereon, and the coupons of the several leaves having different cash values, substantially as set forth.

D. FRANK PARKER.

Witnesses:
 ENOS JOHNSON,
 T. C. HACKER.